United States Patent
Kimura

(10) Patent No.: US 10,625,777 B2
(45) Date of Patent: Apr. 21, 2020

(54) ATTITUDE CONTROL SYSTEM

(71) Applicant: JTEKT CORPORATION, Osaka-shi, Osaka (JP)

(72) Inventor: Shuuji Kimura, Kashiba (JP)

(73) Assignee: JTEKT CORPORATION, Osaka (JP)

( * ) Notice: Subject to any disclaimer, the term of this patent is extended or adjusted under 35 U.S.C. 154(b) by 148 days.

(21) Appl. No.: 15/903,357

(22) Filed: Feb. 23, 2018

(65) Prior Publication Data
US 2018/0251151 A1    Sep. 6, 2018

(30) Foreign Application Priority Data
Mar. 6, 2017  (JP) .................................. 2017-041625

(51) Int. Cl.
*B62D 6/00* (2006.01)
*B60W 10/20* (2006.01)
(Continued)

(52) U.S. Cl.
CPC .............. *B62D 6/006* (2013.01); *B60W 10/04* (2013.01); *B60W 10/20* (2013.01); *B60W 30/045* (2013.01); *B60W 40/064* (2013.01); *B60W 40/068* (2013.01); *B60W 40/103* (2013.01); *B60W 40/114* (2013.01);
(Continued)

(58) Field of Classification Search
CPC .... B60W 10/04; B60W 10/20; B60W 30/045; B60W 40/064; B60W 40/068; B60W 40/103; B60W 40/114; B60W 2510/207; B60W 2520/125; B60W 2520/14; B60W 2520/20; B60W 2520/28; B60W 2520/30; B60W 2540/10; B60W 2550/148;
(Continued)

(56) References Cited

U.S. PATENT DOCUMENTS 4,703,822 A   11/1987  Kawamoto et al.
5,648,903 A    7/1997  Liubakka
(Continued)

FOREIGN PATENT DOCUMENTS

DE   102 08 418 A1   10/2002
JP   H02-18174 A      1/1990
JP   2004-249971 A    9/2004

OTHER PUBLICATIONS

Jul. 18, 2018 Extended Search Report issued in EP Patent Application No. 18159524.0.

*Primary Examiner* — Anthony R Jimenez
(74) *Attorney, Agent, or Firm* — Oliff PLC

(57) ABSTRACT

An object is to provide an attitude control system that can suppress an understeering characteristic when a vehicle such as an automobile travels in a medium-speed or low-speed range. A vehicle drives front wheels, and controls steering angles of the front wheels and steering angles of rear wheels. In an attitude control system to be mounted on the vehicle, a control amount detecting unit detects an operation amount of an accelerator pedal operated by a driver of the vehicle. A driving force estimating unit estimates a driving force generated on the front wheels based on the operation amount of the accelerator pedal. A rear-wheel steering angle determining unit determines a rear-wheel steering angle instruction value for controlling steering angles of the rear wheels based on an estimated front-wheel driving force that is the driving force estimated by the driving force estimating unit.

3 Claims, 5 Drawing Sheets

(51) Int. Cl.
*B60W 40/068* (2012.01)
*B60W 40/064* (2012.01)
*B60W 40/103* (2012.01)
*B60W 40/114* (2012.01)
*B60W 30/045* (2012.01)
*B60W 10/04* (2006.01)
*B62D 7/15* (2006.01)

(52) U.S. Cl.
CPC .............. *B62D 6/005* (2013.01); *B62D 7/159* (2013.01); *B60W 2510/207* (2013.01); *B60W 2520/125* (2013.01); *B60W 2520/14* (2013.01); *B60W 2520/20* (2013.01); *B60W 2520/28* (2013.01); *B60W 2520/30* (2013.01); *B60W 2540/10* (2013.01); *B60W 2550/148* (2013.01); *B60W 2720/14* (2013.01); *B60W 2720/20* (2013.01); *B60W 2720/28* (2013.01)

(58) Field of Classification Search
CPC ......... B60W 2720/14; B60W 2720/20; B60W 2720/28; B62D 6/005; B62D 6/006
See application file for complete search history.

(56) References Cited

U.S. PATENT DOCUMENTS

| | | |
|---|---|---|
| 2002/0147532 A1 | 10/2002 | Inagaki et al. |
| 2004/0186647 A1 | 9/2004 | Ono |
| 2008/0119988 A1 | 5/2008 | Yasui et al. |

ATTITUDE CONTROL SYSTEM

INCORPORATION BY REFERENCE

The disclosure of Japanese Patent Application No. 2017-041625 filed on Mar. 6, 2017 including the specification, drawings and abstract, is incorporated herein by reference in its entirety.

BACKGROUND OF THE INVENTION

1. Field of the Invention

The present invention relates to an attitude control system, and more specifically, to an attitude control system to be mounted on a vehicle configured to drive front wheels and to control steering angles of the front wheels and steering angles of rear wheels.

2. Description of the Related Art

Recent vehicles such as automobiles are generally front-wheel-drive and front-wheel-steering type vehicles. The front-wheel-drive and front-wheel-steering type vehicles have a characteristic in which a resultant force of a driving force generated on the front wheels and a lateral force generated on the front wheels is likely to exceed the limit of a grip force of the front wheels. The grip force of the front wheels is a force applied to a tire ground surface from the front wheels.

Vehicles such as automobiles are designed to have an understeering characteristic in which the turning radius increases when the vehicle is accelerated while making a turn at a constant speed. The understeering characteristic of the vehicle suppresses spinning of the vehicle during its traveling in a high-speed range.

Due to the understeering characteristic of the vehicle, however, the driver of the vehicle may fail to operate the vehicle so that the vehicle travels along a traveling locus intended by the driver. For example, when the front-wheel-drive and front-wheel-steering type vehicle is accelerated while making a turn in a medium-speed or low-speed range (for example, 20 to 60 km/h), the traveling locus of the vehicle deviates outward from the traveling locus intended by the driver. As a result, the driver needs to perform an operation of decelerating the vehicle or increasing the rotation angle of the steering wheel in order to adjust the traveling locus of the vehicle to the traveling locus intended by the driver.

This phenomenon may be addressed by suppressing the understeering characteristic of the vehicle when the vehicle is traveling in the medium-speed or low-speed range.

Japanese Patent Application Publication No. 2004-249971 (JP 2004-249971 A) discloses a vehicle control system to be mounted on a vehicle configured to drive and steer front wheels and also rear wheels. However, JP 2004-249971 A does not disclose the technology for suppressing the understeering characteristic when the vehicle is traveling in the medium-speed or low-speed range.

SUMMARY OF THE INVENTION

It is one object of the present invention to provide an attitude control system that can suppress an understeering characteristic when a vehicle such as an automobile travels in a medium-speed or low-speed range.

An attitude control system according to one aspect of the present invention is mounted on a vehicle configured to drive a front wheel and to control a steering angle of the front wheel and a steering angle of a rear wheel. The attitude control system includes a control amount detecting unit, a driving force estimating unit, and a rear-wheel steering angle determining unit. The control amount detecting unit is configured to detect a control amount of a driving force control system of the vehicle. The driving force estimating unit is configured to estimate a driving force generated on the front wheel based on the control amount. The rear-wheel steering angle determining unit is configured to determine a rear-wheel steering angle instruction value for controlling the steering angle of the rear wheel based on an estimated front-wheel driving force that is the driving force estimated by the driving force estimating unit.

The attitude control system of the aspect described above can suppress the understeering characteristic when the vehicle such as an automobile travels in the medium-speed or low-speed range.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS (First Configuration)

Figure 1:
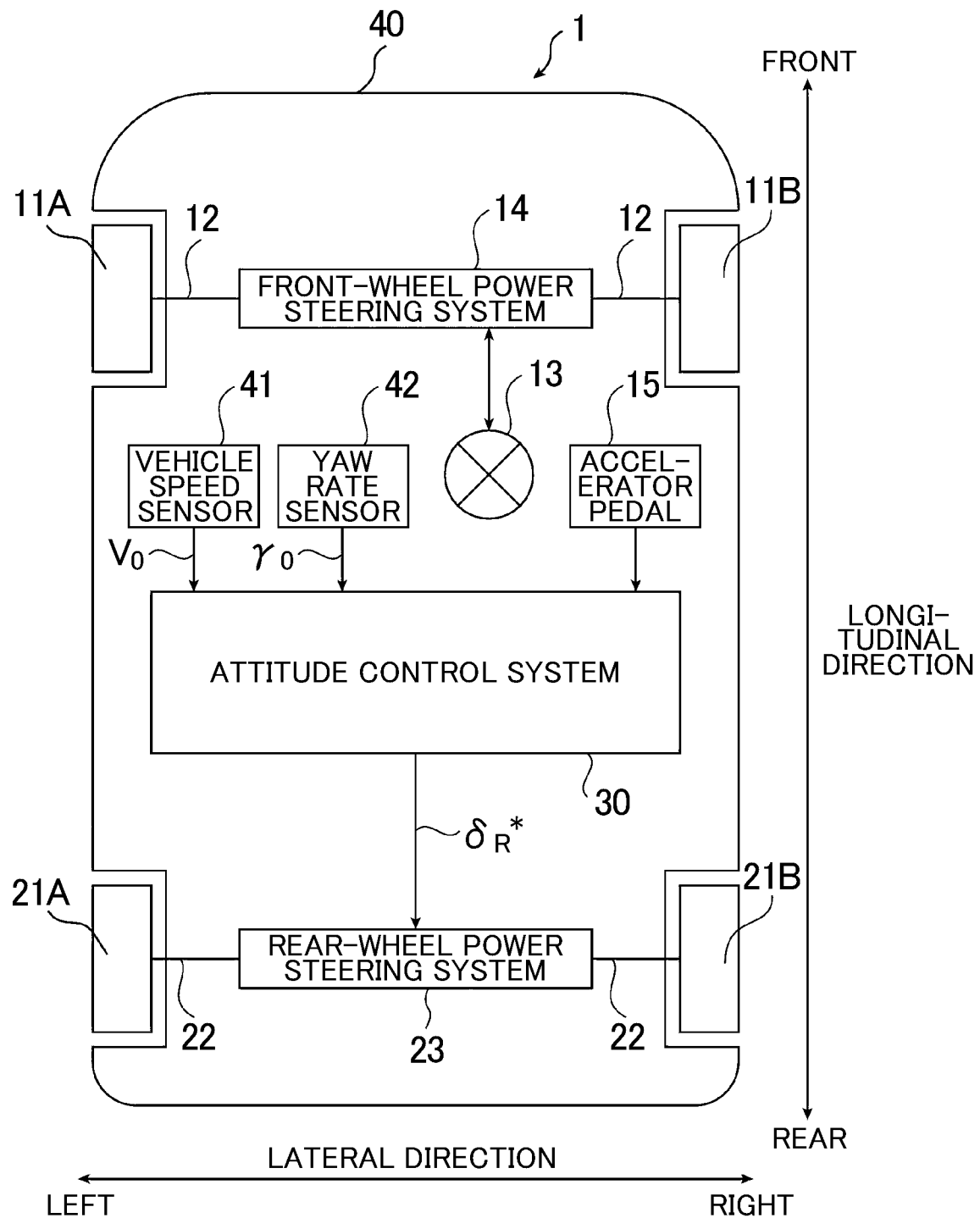
FIG. 1 is a diagram schematically illustrating a vehicle on which an attitude control system according to an embodiment of the present invention is mounted.

An attitude control system according to one embodiment of the present invention is mounted on a vehicle configured to drive a front wheel and to control a steering angle of the front wheel and a steering angle of a rear wheel. The attitude control system includes a control amount detecting unit, a driving force estimating unit, and a rear-wheel steering angle determining unit. The control amount detecting unit is configured to detect a control amount of a driving force control system of the vehicle. The driving force estimating unit is configured to estimate a driving force generated on the front wheel based on the control amount. The rear-wheel steering angle determining unit is configured to determine a rear-wheel steering angle instruction value for controlling the steering angle of the rear wheel based on an estimated front-wheel driving force that is the driving force estimated by the driving force estimating unit.

According to the first configuration, the rear-wheel steering angle determining unit determines the rear-wheel steering angle instruction value by using the estimated front-wheel driving force determined based on the control amount of the driving force control system. Therefore, when the vehicle is accelerated while making a turn, a lateral force for keeping a turning radius can be generated on the rear wheel of the vehicle. Thus, an understeering characteristic of the vehicle can be suppressed when the vehicle travels in a medium-speed or low-speed range.

(Second Configuration)

In the first configuration, the rear-wheel steering angle determining unit includes a rear-wheel steering angle calculating unit. The rear-wheel steering angle calculating unit is configured to calculate the rear-wheel steering angle instruction value based on a speed of the vehicle at a reference time that is a time when the estimated front-wheel driving force is estimated, and based on a yaw rate of the vehicle at the reference time.

According to the second configuration, the rear-wheel steering angle instruction value is determined based on the speed of the vehicle and the yaw rate of the vehicle. Therefore, the turning radius of the vehicle can be kept unless a driver of the vehicle performs an operation of changing the steering angle of the front wheel. The number of operations performed by the driver of the vehicle in order to keep the turning radius can be reduced, and thus a burden of the operation on the driver can be reduced.

(Third Configuration)

In the second configuration, the attitude control system further includes a target slip angle determining unit. The target slip angle determining unit is configured to determine a target value of a gravitational-center slip angle that is an angle formed between a traveling direction of the vehicle and a vehicle reference line extending in a longitudinal direction of the vehicle through a gravitational center of the vehicle. The rear-wheel steering angle calculating unit is configured to calculate the rear-wheel steering angle instruction value based on the target value of the gravitational-center slip angle. The target slip angle determining unit is configured to determine the target value of the gravitational-center slip angle so that a sum of the target value of the gravitational-center slip angle and a rotation component angle is smaller than the rotation component angle. The rotation component angle is formed based on the yaw rate of the vehicle at the reference time and the speed of the vehicle at the reference time. It is desirable that the target slip angle determining unit determine the target value of the gravitational-center slip angle so that the rotation component angle is zero.

According to the third configuration, when the driving force of the front wheel increases, the target slip angle determining unit can eliminate the rotation component angle that is formed based on the yaw rate and the vehicle speed in the lateral force generated on the front wheel. A phenomenon in which a grip force of the front wheel reaches saturation in a tire friction circle is suppressed. Thus, it is possible to expand a range in which the acceleration intended by the driver is achieved even while the vehicle is making a turn.

(Fourth Configuration)

In the second or third configuration, the rear-wheel steering angle determining unit further includes a correction coefficient determining unit and a rear-wheel steering angle correcting unit. The correction coefficient determining unit is configured to acquire an upper limit value of a magnitude of the estimated front-wheel driving force, and to determine a correction coefficient by using the acquired upper limit value and the magnitude of the estimated front-wheel driving force. The rear-wheel steering angle correcting unit is configured to correct the rear-wheel steering angle instruction value determined by the rear-wheel steering angle calculating unit by using the correction coefficient.

According to the fourth configuration, the rear-wheel steering angle instruction value is corrected by using the correction coefficient. For example, when an accelerator pedal is depressed, the rear-wheel steering angle instruction value is calculated based on an operation amount of the accelerator pedal, therefore the rear-wheel steering angle is controlled so that the driver can easily control the vehicle.

(Fifth Configuration)

In the fourth configuration, the attitude control system further includes an upper limit determining unit. The upper limit determining unit is configured to determine, as the upper limit value, a magnitude of a resultant force of a driving force generated on the front wheel at the reference time and a lateral force generated on the front wheel at the reference time.

According to the fifth configuration, because the upper limit value is not output exceeding the limit of the grip force of front wheel tyres, by limiting the rear-wheel steering angle instruction value based on the upper limit value, the rear-wheel steering angle is generally controlled so that the force applied to the rear wheel tyres don't exceed the limit of the grip force of the tyres. Therefore, breakdown of the grip force of the rear wheel tyres caused by steering the rear wheels can be suppressed when the vehicle is making a turn on a road of low coefficient of friction or making a turn at high centripetal acceleration.

The embodiment of the present invention is described below in detail with reference to the drawings. In the drawings, the same or corresponding parts are represented by the same reference symbols, and their description is not repeated.

The configuration of a vehicle 1 is described below. FIG. 1 is a diagram schematically illustrating the vehicle 1 on which an attitude control system 30 according to this embodiment is mounted. FIG. 1 corresponds to a view of the vehicle 1 as seen from the top (plan view).

In FIG. 1, the vertical direction of the drawing sheet is a longitudinal direction of the vehicle 1. Specifically, the upper side of the drawing sheet is a front side of the vehicle 1, and the lower side of the drawing sheet is a rear side of the vehicle 1. The horizontal direction of the drawing sheet is a lateral direction of the vehicle 1. Specifically, the right side of the drawing sheet is a right side of the vehicle 1, and the left side of the drawing sheet is a left side of the vehicle 1.

The vehicle 1 illustrated in FIG. 1 is a front-wheel-drive type vehicle. In FIG. 1, illustration of a configuration for driving front wheels 11A and 11B (engine or the like) is omitted. FIG. 1 illustrates an electrical or mechanical connection relationship among constituent elements to be used for attitude control of the vehicle 1, but does not illustrate specific positions of the constituent elements to which they are actually arranged and specific structures of the constituent elements.

The vehicle 1 controls not only steering angles of the front wheels 11A and 11B, but also steering angles of rear wheels 21A and 21B. The steering angles of the front wheels 11A and 11B are not necessarily equal to the steering angles of the rear wheels 21A and 21B.

A driver of the vehicle 1 steers the front wheels 11A and 11B by rotating a steering wheel 13. The rotation amount of the steering wheel 13 is not used for controlling the steering angles of the rear wheels 21A and 21B. When the driver of the vehicle 1 operates an accelerator pedal 15, the rear wheels 21A and 21B of the vehicle 1 may be steered. When the driver of the vehicle 1 does not operate the accelerator pedal 15, the rear wheels 21A and 21B are not steered.

The configuration of the vehicle 1 is described with reference to FIG. 1. The vehicle 1 includes the front wheels 11A and 11B, front-wheel axles 12, the steering wheel 13, a front-wheel power steering system 14, the accelerator pedal 15, the rear wheels 21A and 21B, rear-wheel axles 22, a rear-wheel power steering system 23, the attitude control system 30, and a vehicle body 40.

The front wheel 11A is arranged on a left front side of the vehicle body 40. The front wheel 11B is arranged on a right front side of the vehicle body 40. The front wheels 11A and 11B are driving wheels of the vehicle 1, and rotate about a rotation center axis defined along the front-wheel axles 12 arranged on a front side of the vehicle body 40. The front-wheel axles 12 are drive shafts of the vehicle 1, and transmit power output from the engine (not illustrated) to the front wheels 11A and 11B.

The rear wheel 21A is arranged on a left rear side of the vehicle body 40. The rear wheel 21B is arranged on a right rear side of the vehicle body 40. The rear wheels 21A and 21B rotate about a rotation center axis defined along the rear-wheel axles 22 arranged on a rear side of the vehicle body 40.

The steering wheel 13 is operated by the driver of the vehicle 1, and is used by the driver for indicating a traveling direction of the vehicle 1. The front-wheel power steering system 14 assists rotation of a steering shaft (not illustrated) based on a rotational torque of the steering wheel 13.

The accelerator pedal 15 is operated by the driver of the vehicle 1, and is used by the driver of the vehicle 1 for indicating an amount of fuel injection to the engine (not illustrated).

The attitude control system 30 determines a rear-wheel steering angle instruction value $\delta_R^*$ for instructing the rear-wheel power steering system 23 on the steering angles of the rear wheels 21A and 21B based on an operation amount of the accelerator pedal 15 operated by the driver of the vehicle 1. Details of the determination of the rear-wheel steering angle instruction value $\delta_R^*$ are described later.

The rear-wheel power steering system 23 changes the steering angles of the rear wheels 21A and 21B based on the rear-wheel steering angle instruction value $\delta_R^*$ determined by the attitude control system 30.

The vehicle 1 further includes a vehicle speed sensor 41 and a yaw rate sensor 42. The vehicle speed sensor 41 detects a vehicle speed $V_0$ in the longitudinal direction of the vehicle 1. For example, the vehicle speed sensor 41 outputs, as the vehicle speed $V_0$, a value calculated based on the number of revolutions of the front wheel 11A or the front wheel 11B per unit time in the vehicle 1. The yaw rate sensor 42 detects a yaw rate $\gamma_0$ of the vehicle 1. The definition of the yaw rate $\gamma_0$ is described later.

Figure 2:
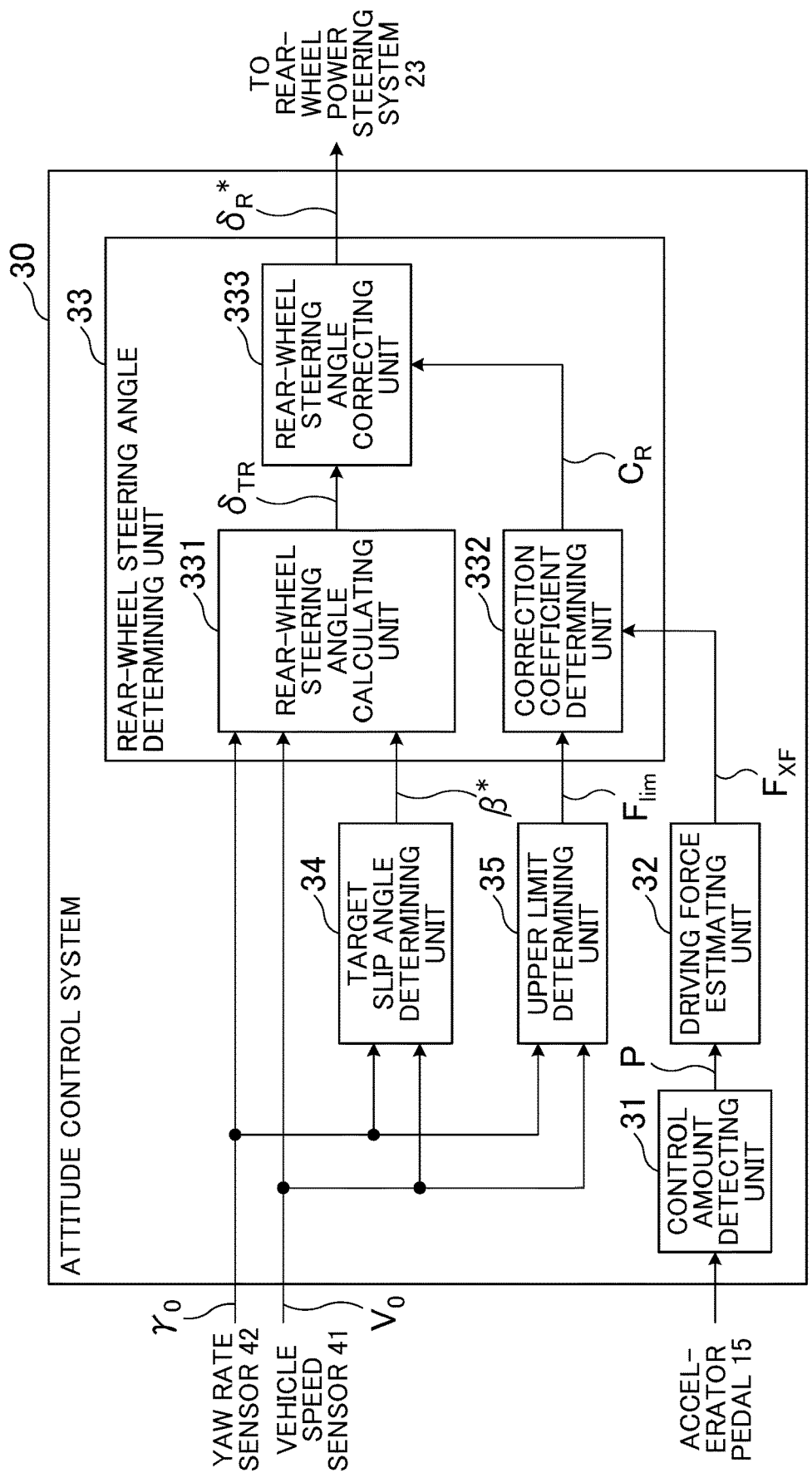
FIG. 2 is a functional block diagram illustrating the configuration of the attitude control system illustrated in FIG. 1.

Next, the configuration of the attitude control system 30 is described. FIG. 2 is a functional block diagram illustrating the configuration of the attitude control system 30 illustrated in FIG. 1. The configuration of the attitude control system 30 is described with reference to FIG. 2.

The attitude control system 30 includes a control amount detecting unit 31, a driving force estimating unit 32, a rear-wheel steering angle determining unit 33, a target slip angle determining unit 34, and an upper limit determining unit 35.

The control amount detecting unit 31 detects an operation amount P of the accelerator pedal 15 operated by the driver of the vehicle 1. The operation amount P is a depression amount of the accelerator pedal 15 with respect to a state in which the accelerator pedal 15 is not depressed. That is, the control amount detecting unit 31 detects the degree of depression of the accelerator pedal 15 by the driver of the vehicle 1. The control amount detecting unit 31 detects the operation amount of the accelerator pedal 15 as a control amount of a driving force control system configured to control a prime mover such as an engine or a drive motor for driving the vehicle 1.

The driving force estimating unit 32 estimates a driving force of the front wheels 11A and 11B that is intended by the driver of the vehicle 1 based on the operation amount P of the accelerator pedal 15 that is detected by the control amount detecting unit 31. The driving force estimating unit 32 outputs the estimated driving force of the front wheels 11A and 11B to the rear-wheel steering angle determining unit 33 as an estimated front-wheel driving force $F_{XF}$.

The rear-wheel steering angle determining unit 33 acquires the estimated front-wheel driving force $F_{XF}$ estimated by the driving force estimating unit 32, the vehicle speed $V_0$ detected by the vehicle speed sensor 41, and the yaw rate $\gamma_0$ detected by the yaw rate sensor 42. The rear-wheel steering angle determining unit 33 determines the rear-wheel steering angle instruction value $\delta_R^*$ based on the acquired estimated front-wheel driving force $F_{XF}$, the acquired vehicle speed $V_0$, and the acquired yaw rate $\gamma_0$. The configuration of the rear-wheel steering angle determining unit 33 is described later.

The target slip angle determining unit 34 acquires the vehicle speed $V_0$ detected by the vehicle speed sensor 41 and the yaw rate $\gamma_0$ detected by the yaw rate sensor 42. The target slip angle determining unit 34 determines a gravitational-center slip angle target value $\beta^*$ based on the acquired vehicle speed $V_0$ and the acquired yaw rate $\gamma_0$. The gravitational-center slip angle is a slip angle at a gravitational center of the vehicle 1.

The upper limit determining unit 35 acquires the vehicle speed $V_0$ detected by the vehicle speed sensor 41 and the yaw rate $\gamma_0$ detected by the yaw rate sensor 42. The upper limit determining unit 35 determines an estimated driving force upper limit value $F_{lim}$ based on the acquired vehicle speed $V_0$ and the acquired yaw rate $\gamma_0$. The estimated driving force upper limit value $F_{lim}$ is an upper limit value of the magnitude of the estimated front-wheel driving force $F_{XF}$.

Next, the configuration of the rear-wheel steering angle determining unit 33 is described. The rear-wheel steering angle determining unit 33 includes a rear-wheel steering angle calculating unit 331, a correction coefficient determining unit 332, and a rear-wheel steering angle correcting unit 333.

The rear-wheel steering angle calculating unit 331 acquires the gravitational-center slip angle target value $\beta^*$ determined by the target slip angle determining unit 34, the vehicle speed $V_0$ detected by the vehicle speed sensor 41, and the yaw rate $\gamma_0$ detected by the yaw rate sensor 42. The rear-wheel steering angle calculating unit 331 calculates a rear-wheel steering angle target value $\delta_{TR}$ based on the acquired gravitational-center slip angle target value $\beta^*$, the acquired vehicle speed $V_0$, and the acquired yaw rate $\gamma_0$. Details of the rear-wheel steering angle target value $\delta_{TR}$ are described later.

The correction coefficient determining unit 332 acquires the estimated front-wheel driving force $F_{XF}$ estimated by the driving force estimating unit 32 and the estimated driving force upper limit value $F_{lim}$ determined by the upper limit determining unit 35. The correction coefficient determining unit 332 determines a correction coefficient $C_R$ by using the acquired estimated front-wheel driving force $F_{XF}$ and the acquired estimated driving force upper limit value $F_{lim}$. The correction coefficient $C_R$ is a numerical value that is equal to or larger than 0 and is equal to or smaller than 1.

The rear-wheel steering angle correcting unit 333 acquires the rear-wheel steering angle target value $\delta_{TR}$ calculated by the rear-wheel steering angle calculating unit 331 and the correction coefficient $C_R$ determined by the correction coefficient determining unit 332. The rear-wheel steering angle correcting unit 333 corrects the rear-wheel steering angle target value $\delta_{TR}$ by using the correction coefficient $C_R$. The rear-wheel steering angle correcting unit 333 outputs the corrected rear-wheel steering angle target value $\delta_{TR}$ to the rear-wheel power steering system 23 as the rear-wheel steering angle instruction value $\delta_R{}^*$.

Next, modeling on the vehicle 1 is described. The attitude control system 30 determines the rear-wheel steering angle instruction value $\delta_R{}^*$ by using mathematical expressions derived from a vehicle modeled on the vehicle 1. The vehicle modeled on the vehicle 1 is described below with reference to FIG. 3.

Figure 3:
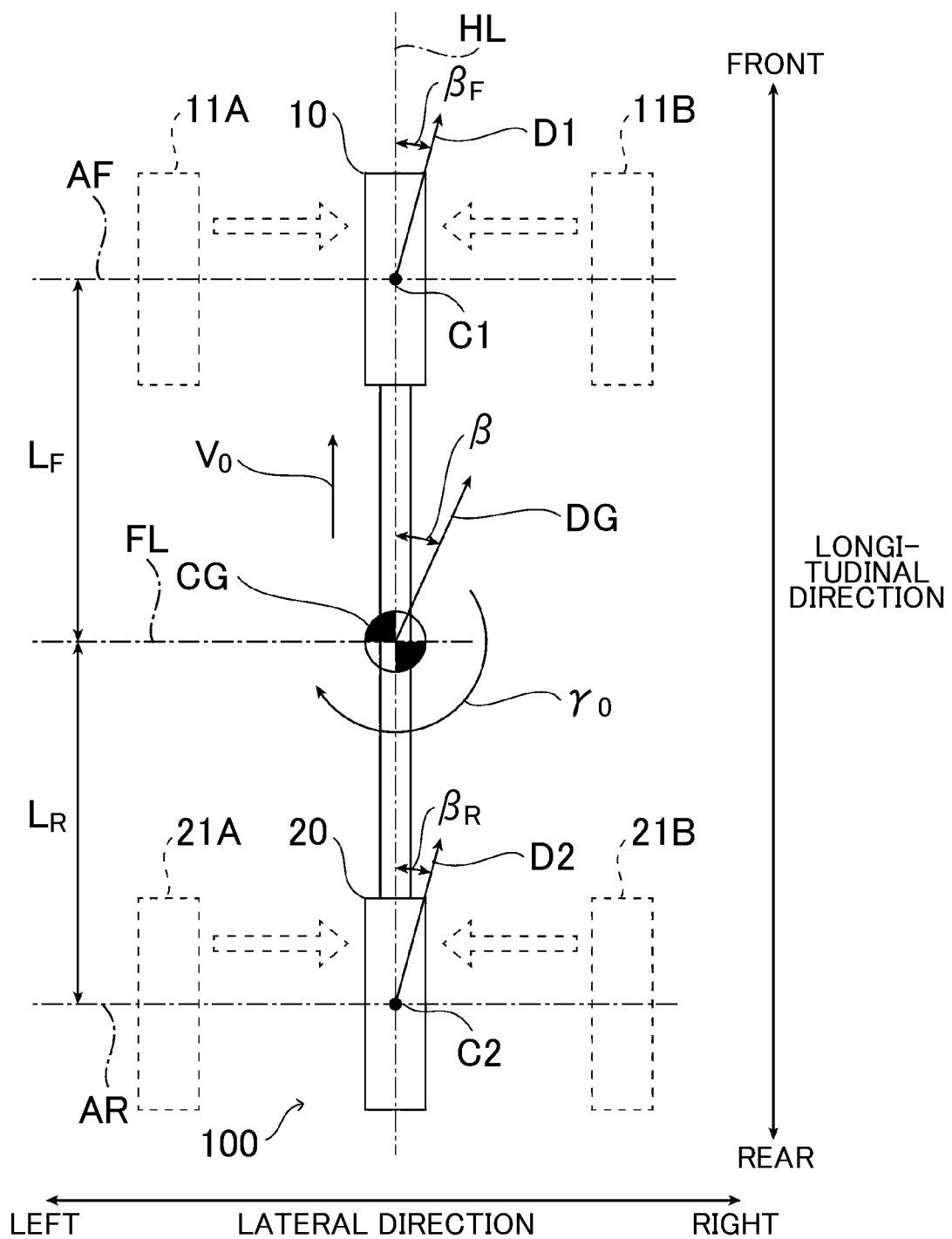
FIG. 3 is a diagram illustrating a modeled vehicle, which is modeled on the vehicle illustrated in FIG. 1.

FIG. 3 is a diagram illustrating a modeled vehicle 100, which is modeled on the vehicle 1 illustrated in FIG. 1. In FIG. 3, the vertical direction of the drawing sheet is a longitudinal direction of the modeled vehicle 100. Specifically, the upper side of the drawing sheet is a front side of the modeled vehicle 100, and the lower side of the drawing sheet is a rear side of the modeled vehicle 100. In FIG. 3, the horizontal direction of the drawing sheet is a lateral direction of the modeled vehicle 100. Specifically, the right side of the drawing sheet is a right side of the modeled vehicle 100, and the left side of the drawing sheet is a left side of the modeled vehicle 100.

As illustrated in FIG. 3, the modeled vehicle 100 is a modeled vehicle in which the front wheels 11A and 11B of the vehicle 1 illustrated in FIG. 1 are equivalently replaced with one front wheel 10 and the rear wheels 21A and 21B of the vehicle 1 are equivalently replaced with one rear wheel 20. As described later, the rear-wheel steering angle instruction value $\delta_R{}^*$ is determined by using mathematical expressions obtained from the modeled vehicle 100.

The vehicle speed $V_0$ of the vehicle 1 may be used as a vehicle speed of the modeled vehicle 100. The yaw rate $\gamma_0$ of the vehicle 1 may be used as a yaw rate of the modeled vehicle 100.

In FIG. 3, a central axis HL is an axis extending in the longitudinal direction through a center of the lateral width of the modeled vehicle 100 and through a gravitational center CG. A lateral axis FL is an axis orthogonal to the central axis HL that is a longitudinal axis of the modeled vehicle 100, and extends through the gravitational center CG of the modeled vehicle 100.

A rotational axis AF is a rotational axis of the front wheel 10. A rotational axis AR is a rotational axis of the rear wheel 20. When the modeled vehicle 100 is traveling straightforward, the rotational axes AF and AR are orthogonal to the central axis HL as illustrated in FIG. 3. When the modeled vehicle 100 is traveling straightforward, the rotational axis AF coincides with the front-wheel axles 12 illustrated in FIG. 1, and the rotational axis AR coincides with the rear-wheel axles 22 illustrated in FIG. 1.

Parameters to be used when the modeled vehicle 100 makes a turn are described below.

As illustrated in FIG. 3, a gravitational-center slip angle $\beta$ is defined as an angle formed between a traveling direction DG of the modeled vehicle 100 and the central axis HL. The traveling direction DG is a traveling direction of the modeled vehicle 100 at the gravitational center CG. When the traveling direction DG is oriented to the right with respect to the central axis HL as the gravitational center CG of the modeled vehicle 100 is seen from the rear wheel 20 side, the gravitational-center slip angle $\beta$ is positive. When the traveling direction DG is oriented to the left with respect to the central axis HL as the gravitational center CG of the modeled vehicle 100 is seen from the rear wheel 20 side, the gravitational-center slip angle $\beta$ is negative.

Figure 4:
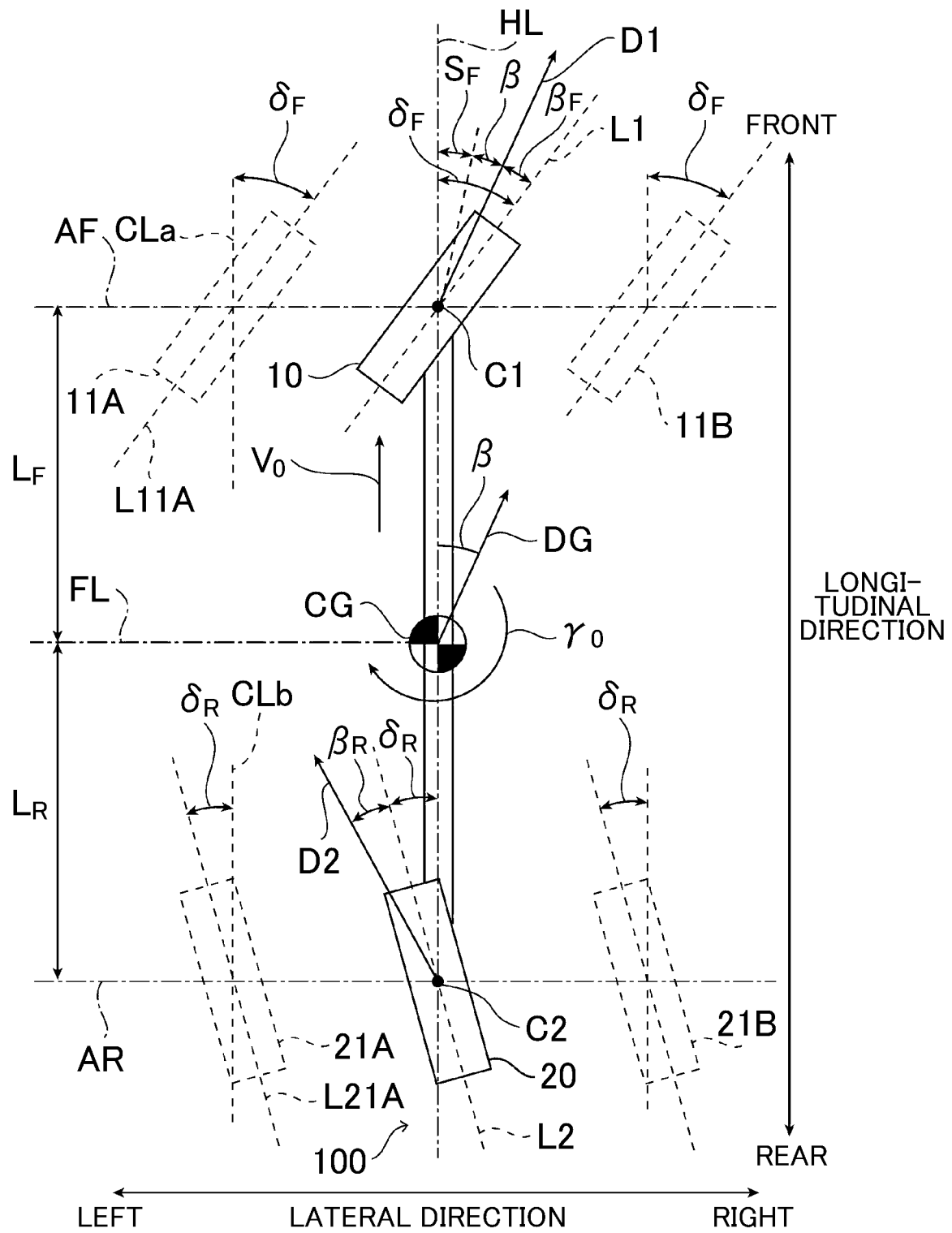
FIG. 4 is a diagram illustrating a state in which the modeled vehicle illustrated in FIG. 3 is making a turn to the right.

FIG. 4 is a diagram illustrating a state in which the modeled vehicle 100 illustrated in FIG. 3 is making a turn to the right.

Referring to FIG. 4, a front-wheel sideslip angle $\beta_F$ of the modeled vehicle 100 is an angle formed between a reference line L1 of the front wheel 10 and a traveling direction D1 at a center C1 of the front wheel 10. The center C1 of the front wheel 10 coincides with an intersection between the central axis HL and the rotational axis AF. The reference line L1 of the front wheel 10 coincides with a central axis of the front wheel 10 in the lateral direction. When the modeled vehicle 100 is traveling straightforward, the reference line L1 of the front wheel 10 coincides with the central axis HL.

When the traveling direction D1 is oriented to the right with respect to the reference line L1 of the front wheel 10 as the front wheel 10 of the modeled vehicle 100 is seen from the rear wheel 20 side, the front-wheel sideslip angle $\beta_F$ is positive. When the traveling direction D1 is oriented to the left with respect to the reference line L1 of the front wheel 10 as the front wheel 10 of the modeled vehicle 100 is seen from the rear wheel 20 side, the front-wheel sideslip angle $\beta_F$ is negative.

Referring to FIG. 4, a rear-wheel sideslip angle $\beta_R$ of the modeled vehicle 100 is an angle formed between a reference line L2 of the rear wheel 20 and a traveling direction D2 at a center C2 of the rear wheel 20. The center C2 of the rear wheel 20 coincides with an intersection between the central axis HL and the rotational axis AR. The reference line L2 of the rear wheel 20 coincides with a central axis of the rear wheel 20 in the lateral direction. When the modeled vehicle 100 is traveling straightforward, the reference line L2 of the rear wheel 20 coincides with the central axis HL.

When the traveling direction D2 is oriented to the right with respect to the reference line L2 of the rear wheel 20 as the front wheel 10 of the modeled vehicle 100 is seen from the rear wheel 20, the rear-wheel sideslip angle $\beta_R$ is positive. When the traveling direction D2 is oriented to the left with respect to the reference line L2 of the rear wheel 20 as the front wheel 10 of the modeled vehicle 100 is seen from the rear wheel 20, the rear-wheel sideslip angle $\beta_R$ is negative.

Referring to FIG. 3, the vehicle speed $V_0$ is a speed of the modeled vehicle 100 in the longitudinal direction. The yaw rate $\gamma_0$ is an angular velocity about a vertical axis of the modeled vehicle 100. The vertical axis of the modeled vehicle 100 is a straight line that extends through the gravitational center CG and is perpendicular to both of the central axis HL and the lateral axis FL. The positive direction of the yaw rate $\gamma_0$ is a clockwise direction about the vertical axis.

A front axis-to-gravitational center distance $L_F$ is a distance from the gravitational center CG to the center C1 of the front wheel 10 in the longitudinal direction of the modeled vehicle 100. In the vehicle 1 illustrated in FIG. 1, the front axis-to-gravitational center distance $L_F$ is determined as a distance from the front-wheel axle 12 to the gravitational center of the vehicle 1 in the longitudinal direction.

A rear axis-to-gravitational center distance $L_R$ is a distance from the gravitational center CG to the center C2 of the rear wheel 20 in the longitudinal direction of the modeled vehicle 100. In the vehicle 1 illustrated in FIG. 1, the rear axis-to-gravitational center distance $L_R$ is determined as a distance from the rear-wheel axle 22 to the gravitational center of the vehicle 1 in the longitudinal direction.

Next, a relationship between a steering angle of the front wheel 10 of the modeled vehicle 100 and steering angles $\delta_F$ of the front wheels 11A and 11B of the vehicle 1 is described with reference to FIG. 4. When the modeled vehicle 100 makes a turn to the right, the front wheel 10 rotates clockwise about the center C1.

The steering angles $\delta_F$ of the front wheels 11A and 11B are described taking the front wheel 11A as an example. The steering angle $\delta_F$ of the front wheel 11A is an angle formed between a central line L11A of the front wheel 11A and the central axis HL. The central line L11A coincides with a central axis of the front wheel 11A in the lateral direction. For the clarity of the steering angle $\delta_F$ of the front wheel 11A, FIG. 4 illustrates the steering angle $\delta_F$ of the front wheel 11A as an angle formed between the central line L11A of the front wheel 11A and a line CLa. The line CLa is a line that is translated from the central axis HL in the lateral direction of the modeled vehicle 100.

As described above, the front wheel 10 of the modeled vehicle 100 is an imaginary wheel that is an equivalent replacement for the front wheels 11A and 11B. Therefore, when the steering angle of the front wheel 10 is calculated, the attitude control system 30 may use the calculated steering angle of the front wheel 10 as the steering angles $\delta_F$ of the front wheels 11A and 11B.

When the central line of each of the front wheels 10, 11A, and 11B rotates clockwise from the central axis HL, the steering angles $\delta_F$ of the front wheels 10, 11A, and 11B are positive. When the central line of each of the front wheels 10, 11A, and 11B rotates counterclockwise from the central axis HL, the steering angles $\delta_F$ of the front wheels 10, 11A, and 11B are negative.

Steering angles $\delta_R$ of the rear wheels 21A and 21B are described taking the rear wheel 21A as an example. The steering angle $\delta_R$ of the rear wheel 21A is an angle formed between a central line L21A of the rear wheel 21A and the central axis HL. The central line L21A coincides with a central axis of the rear wheel 21A in the lateral direction. For the clarity of the steering angle $\delta_R$ of the rear wheel 21A, FIG. 4 illustrates the steering angle $\delta_R$ of the rear wheel 21A as an angle formed between the central line L21A of the rear wheel 21A and a line CLb. The line CLb is a line that is translated from the central axis HL in the lateral direction of the modeled vehicle 100.

A relationship between a steering angle of the rear wheel 20 of the modeled vehicle 100 and the steering angles $\delta_R$ of the rear wheels 21A and 21B is described. When the modeled vehicle 100 makes a turn to the right, the rear wheel 20 rotates counterclockwise about the center C2.

As described above, the rear wheel 20 of the modeled vehicle 100 is an imaginary wheel that is an equivalent replacement for the rear wheels 21A and 21B. Therefore, when the steering angle of the rear wheel 20 is calculated, the attitude control system 30 may use the calculated steering angle of the rear wheel 20 as the steering angles $\delta_R$ of the rear wheels 21A and 21B.

When the central line of each of the rear wheels 20, 21A, and 21B rotates clockwise from the central axis HL, the steering angles $\delta_R$ of the rear wheels 20, 21A, and 21B are positive. When the central line of each of the rear wheels 20, 21A, and 21B rotates counterclockwise from the central axis HL, the steering angles $\delta_R$ of the rear wheels 20, 21A, and 21B are negative.

Figure 5:
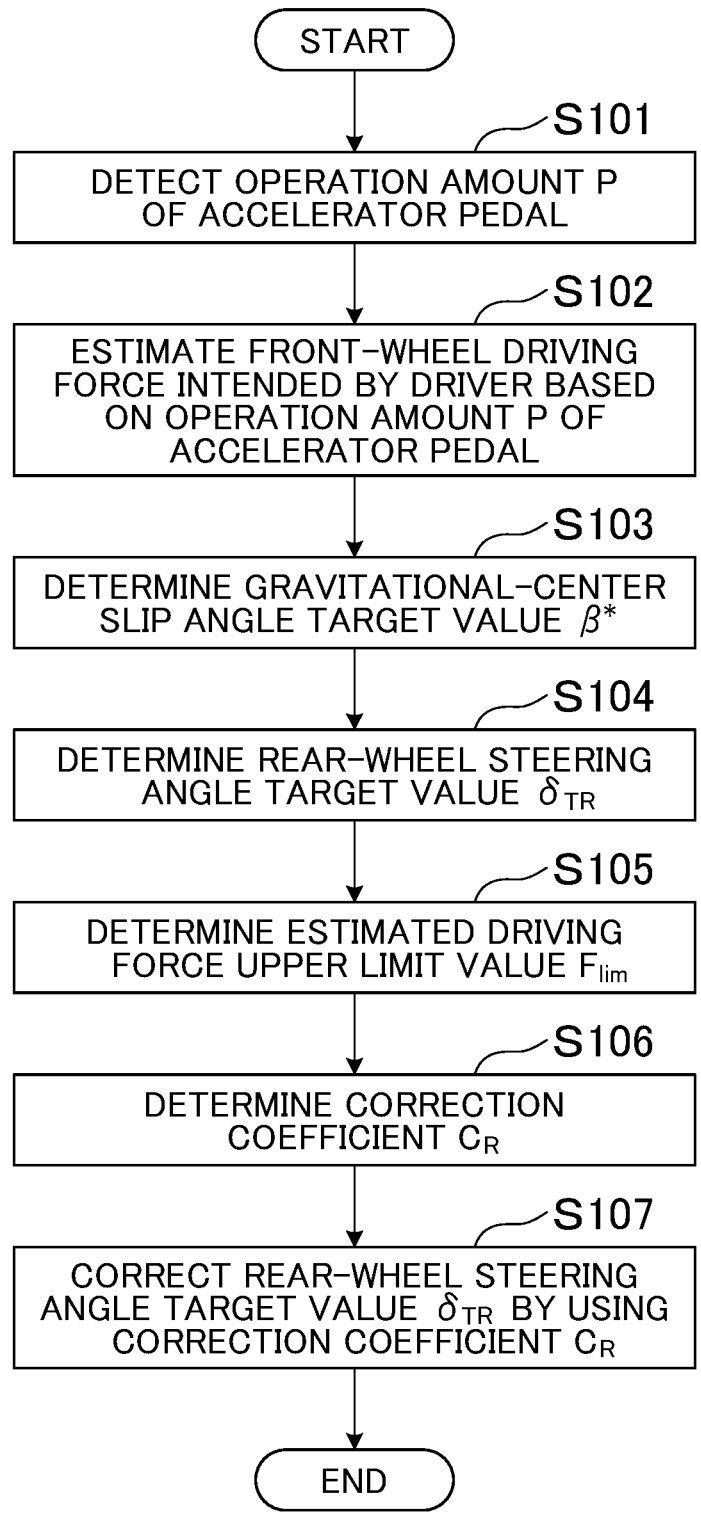
FIG. 5 is a flowchart illustrating an operation of the attitude control system illustrated in FIG. 1.

Next, an operation of the attitude control system 30 is described. The operation of the attitude control system 30 is described below with reference to FIG. 5. FIG. 5 is a flowchart illustrating the operation of the attitude control system 30 illustrated in FIG. 1.

The attitude control system 30 calculates the rear-wheel steering angle instruction value $\delta_R^*$ in real time by repeatedly executing the processing illustrated in FIG. 5. In this embodiment, the attitude control system 30 does not determine the steering angles $\delta_F$ of the front wheels 11A and 11B. The front-wheel power steering system 14 assists the rotation of the steering shaft (not illustrated) based on the rotational torque of the steering wheel 13.

Next, the estimation of the front-wheel driving force is described. Referring to FIG. 5, the control amount detecting unit 31 detects the operation amount P of the accelerator pedal 15 operated by the driver of the vehicle 1 (Step S101). Specifically, the control amount detecting unit 31 detects the depression amount of the accelerator pedal 15 with respect to the state in which the accelerator pedal 15 is not depressed by the driver of the vehicle 1. The control amount detecting unit 31 outputs the detected depression amount to the driving force estimating unit 32 as the operation amount P of the accelerator pedal.

A time when the control amount detecting unit 31 detects the operation amount P of the accelerator pedal 15 is hereinafter referred to as "reference time".

The accelerator pedal 15 is used by the driver of the vehicle 1 for adjusting the vehicle speed $V_0$ of the vehicle 1. Based on the operation amount P of the accelerator pedal 15, the amount of fuel injection to the engine (not illustrated) is determined. Therefore, the operation amount P of the accelerator pedal 15 is used as a parameter indicating the magnitude of a driving force to be applied to the front wheels 11A and 11B by the driver of the vehicle 1.

The driving force estimating unit 32 acquires the operation amount P of the accelerator pedal 15 that is output from the control amount detecting unit 31. The driving force estimating unit 32 determines the estimated front-wheel driving force $F_{XF}$ at the reference time based on the acquired operation amount P of the accelerator pedal 15 (Step S102). The operation amount P of the accelerator pedal 15 corresponds to the control amount of the driving force control system.

Specifically, the driving force estimating unit 32 estimates the estimated front-wheel driving force $F_{XF}$ at the reference time by using Expression (1). The estimated front-wheel driving force $F_{XF}$ is an estimated value of the driving force to be applied to the front wheels 11A and 11B when the driver of the vehicle 1 operates the accelerator pedal 15.

$$F_{XF} = \frac{I_w \cdot P \cdot d}{R_w} - kV_0^2 - R_X \tag{1}$$

In Expression (1), the symbol "$F_{XF}$" represents the estimated front-wheel driving force $F_{XF}$. The symbol "$I_w$" represents a moment of rotational inertia of the front wheels 11A and 11B. The symbol "P" represents the operation amount P of the accelerator pedal 15 that is detected by the control amount detecting unit 31. The symbol "d" represents an angular acceleration coefficient of the front wheels 11A and 11B for the operation amount P of the accelerator pedal

15. Details of the angular acceleration coefficient are described later. The symbol "$R_w$" represents an effective rolling radius. That is, the symbol "$R_w$" represents an effective radius of the front wheels 11A and 11B when the front wheels 11A and 11B rotate. The symbol "k" represents an equivalent air resistance coefficient, which is a constant unique to the vehicle 1 and is a coefficient of an air resistance that acts when the vehicle 1 moves in the longitudinal direction. The symbol "$V_0$" represents the vehicle speed $V_0$ of the vehicle 1 that is detected by the vehicle speed sensor 41. The symbol "$R_x$" represents a rolling resistance of the front wheels 11A and 11B on the ground surface.

The first term on the right side of Expression (1) represents a driving force that is actually generated on the front wheels 11A and 11B when the driver of the vehicle 1 depresses the accelerator pedal 15. The second term on the right side of Expression (1) represents the air resistance received by the vehicle 1 while the vehicle 1 is traveling. As described above, the third term on the right side of Expression (1) represents the rolling resistance received from the ground surface when the front wheels 11A and 11B rotate. The air resistance and the rolling resistance act as forces that resist the forward traveling of the vehicle 1. The reason why the air resistance and the rolling resistance are taken into consideration is that the accelerator pedal 15 may be depressed not only when the driver of the vehicle 1 accelerates the vehicle 1, but also when the driver of the vehicle 1 keeps the speed of the vehicle 1.

In Expression (1), when a resultant force of the air resistance and the rolling resistance is larger than the driving force of the front wheels 11A and 11B that is generated by depressing the accelerator pedal 15, the vehicle 1 is decelerated. That is, the estimated front-wheel driving force $F_{XF}$ may have a value equal to or smaller than 0 depending on the operation amount P of the accelerator pedal 15.

The first term on the right side of Expression (1) is described in more detail. The numerator of the first term on the right side of Expression (1) represents a torque of the front wheels 11A and 11B. The driving force that is actually generated on the front wheels 11A and 11B when the driver of the vehicle 1 depresses the accelerator pedal 15 can be estimated by dividing the torque of the front wheels 11A and 11B by the effective rolling radius $R_w$ of the front wheels 11A and 11B.

The driving force estimating unit 32 uses the moment of rotational inertia of the front wheels 11A and 11B, the operation amount P of the accelerator pedal 15, and the angular acceleration coefficient in order to estimate the torque that is actually generated on the front wheels 11A and 11B. A value obtained by multiplying the operation amount P of the accelerator pedal 15 by the angular acceleration coefficient corresponds to an angular acceleration of the front wheels 11A and 11B. The angular acceleration coefficient is described in detail.

The front wheels 11A and 11B rotate in response to the depression of the accelerator pedal 15 by the driver of the vehicle 1. Thus, the angular acceleration of the front wheels 11A and 11B can be estimated by multiplying the operation amount P of the accelerator pedal 15 by a predetermined coefficient. This predetermined coefficient is the angular acceleration coefficient.

The rotation of the front wheels 11A and 11B changes depending on not only the operation amount P of the accelerator pedal 15, but also a speed reducing ratio of a speed reducer (not illustrated) mounted on the vehicle 1 or the amount of fuel injection to the engine (not illustrated) mounted on the vehicle 1.

Thus, the angular acceleration coefficient is determined based on the speed reducing ratio and the fuel injection amount. For example, the attitude control system 30 includes a non-volatile memory (not illustrated), and the non-volatile memory stores a lookup table in which the speed reducing ratio and the fuel injection amount are associated with each other. The driving force estimating unit 32 acquires the speed reducing ratio and the fuel injection amount at the reference time when the operation amount P of the accelerator pedal 15 is detected, and inputs the acquired speed reducing ratio and the acquired fuel injection amount into the lookup table, thereby acquiring the angular acceleration coefficient.

Next, the determination of the gravitational-center slip angle target value β* is described. The target slip angle determining unit 34 determines the gravitational-center slip angle target value β* of the modeled vehicle 100 at the reference time (time when the control amount detecting unit 31 detects the operation amount P of the accelerator pedal 15) (Step S103).

Specifically, the target slip angle determining unit 34 acquires the vehicle speed $V_0$ at the reference time from the vehicle speed sensor 41, and also acquires the yaw rate $\gamma_0$ at the reference time from the yaw rate sensor 42. The target slip angle determining unit 34 calculates the gravitational-center slip angle target value β* at the reference time by using Expression (2).

$$\beta^* = -\frac{L_F \gamma_0}{V_0} \quad (2)$$

Referring to FIG. 3, the symbol "β*" in Expression (2) represents the gravitational-center slip angle target value β*. The symbol "$\gamma_0$" represents the yaw rate $\gamma_0$ at the reference time that is detected by the yaw rate sensor 42. The symbol "$L_F$" represents the front axis-to-gravitational center distance $L_F$. The front axis-to-gravitational center distance $L_F$ is stored in advance in the non-volatile memory (not illustrated) of the attitude control system 30. The symbol "$V_0$" is described above in Expression (1), and therefore its description is omitted.

The gravitational-center slip angle target value β* obtained by using Expression (2) is canceled out by a rotation component $S_F$ contained in a lateral force generated on the front wheel 10 (see FIG. 4). The reason why the gravitational-center slip angle target value β* is canceled out by the rotation component $S_F$ is described later.

Next, the determination of the rear-wheel steering angle target value $\delta_{TR}$ is described. Referring to FIG. 5, the rear-wheel steering angle calculating unit 331 determines the rear-wheel steering angle target value $\delta_{TR}$ at the reference time (time when the control amount detecting unit 31 detects the operation amount P of the accelerator pedal 15) (Step S104).

Specifically, as illustrated in FIG. 2, the rear-wheel steering angle calculating unit 331 acquires the vehicle speed $V_0$ at the reference time from the vehicle speed sensor 41, and also acquires the yaw rate $\gamma_0$ at the reference time from the yaw rate sensor 42. The rear-wheel steering angle calculating unit 331 acquires the gravitational-center slip angle target value β* at the reference time that is determined by the target slip angle determining unit 34. The rear-wheel steering angle calculating unit 331 determines the rear-wheel steering angle target value $\delta_{TR}$ at the reference time by using Expression (3). The rear-wheel steering angle target value $\delta_{TR}$ is a theoretical value of the steering angle $\delta_R$ of the rear wheel 20 when the modeled vehicle 100 makes a turn by using both of the front wheel 10 and the rear wheel 20.

$$\delta_{TR} = -\frac{ML_F V_0 \gamma_0}{LK_R} - \frac{L_R \gamma_0}{V_0} + \beta^* \quad (3)$$

Referring to FIG. 2, the symbol "$\delta_{TR}$" in Expression (3) represents the rear-wheel steering angle target value $\delta_{TR}$. The symbol "M" represents an inertial mass of the vehicle 1, which is applicable to the modeled vehicle 100. Referring to FIG. 4, the symbol "$L_R$" represents the rear axis-to-gravitational center distance $L_R$. The symbol "L" represents a wheelbase (distance from the rotational axis AF to the rotational axis AR in the longitudinal direction), which is the sum of the front axis-to-gravitational center distance $L_F$ and the rear axis-to-gravitational center distance $L_R$. The symbol "$K_R$" represents a cornering power coefficient of the rear wheel 20. The inertial mass, the rear axis-to-gravitational center distance $L_R$, the wheelbase, and the cornering power coefficient are stored in advance in the non-volatile memory (not illustrated) of the attitude control system 30. The other parameters are described above in Expression (1) and Expression (2), and therefore their description is omitted.

Derivation of Expression (3) is described. Equations of motion of the modeled vehicle 100 illustrated in FIG. 3 are represented by Expression (4) and Expression (5).

$$MV_0(\beta'_0 + \gamma_0) - K_F\left(\beta_0 + \frac{L_F \gamma_0}{V_0} - \delta_F\right) - K_R\left(\beta_0 - \frac{L_R \gamma_0}{V_0} - \delta_R\right) \quad (4)$$

$$I\gamma'_0 = -L_F K_F\left(\beta_0 + \frac{L_F \gamma_0}{V_0} - \delta_F\right) - L_R K_R\left(\beta_0 - \frac{L_R \gamma_0}{V_0} - \delta_R\right) \quad (5)$$

In Expression (4) and Expression (5), the symbol "$\beta_0$" represents the gravitational-center slip angle $\beta$ at the reference time, and the symbol "$\beta'_0$" represents a time derivative value of the gravitational-center slip angle $\beta$ at the reference time. The symbol "$K_F$" represents a cornering power coefficient of the front wheel 10. The symbol "$\gamma'_0$" represents a time derivative value of the yaw rate $\gamma_0$ at the reference time. The other parameters are described above in Expression (1) to Expression (3), and therefore their description is omitted.

In Expression (4) and Expression (5), it is assumed that the turning of the modeled vehicle 100 is in a steady state. In the steady state, the vehicle speed $V_0$ of the modeled vehicle 100 is constant, and the turning radius of the modeled vehicle 100 is also constant. In this case, the time derivative value of the gravitational-center slip angle $\beta_0$ at the reference time is zero, and the time derivative value of the yaw rate $\gamma_0$ at the reference time is also zero. Under those conditions, the steering angle $\delta_R$ of the rear wheel 20 is solved based on Expression (4) and Expression (5), and thus Expression (6) can be obtained.

$$\delta_R = -\frac{ML_F V_0 \gamma_0}{LK_R} - \frac{L_R \gamma_0}{V_0} + \beta_0 \quad (6)$$

In Expression (6), when the steering angle $\delta_R$ of the rear wheel 20 is replaced with the rear-wheel steering angle target value $\delta_{TR}$, and the gravitational-center slip angle $\beta_0$ is replaced with the gravitational-center slip angle target value $\beta^*$, Expression (3) is obtained.

Next, the determination of the estimated driving force upper limit value $F_{lim}$ is described. Referring to FIG. 5, the upper limit determining unit 35 determines the estimated driving force upper limit value $F_{lim}$ at the reference time (time when the control amount detecting unit 31 detects the operation amount P of the accelerator pedal 15) (Step S105).

Specifically, the upper limit determining unit 35 determines the estimated driving force upper limit value $F_{lim}$ by using Expression (7).

$$F_{lim} = \left((MV'_0 + kV_0^2 + R_X)^2 + \left(\frac{L_R M V_0 \gamma_0}{L}\right)^2\right)^{1/2} \quad (7)$$

In Expression (7), the symbol "$F_{lim}$" represents the estimated driving force upper limit value $F_{lim}$. The symbol "$V'_0$" represents a time derivative value of the vehicle speed $V_0$ at the reference time. The other parameters are described above in Expression (1) and Expression (2), and therefore their description is omitted.

As represented by Expression (7), the estimated driving force upper limit value $F_{lim}$ indicates the magnitude of a resultant force of the driving force of the front wheels 11A and 11B and the lateral force of the front wheels 11A and 11B at the reference time. The upper limit determining unit 35 outputs the estimated driving force upper limit value $F_{lim}$ calculated by using Expression (7) to the correction coefficient determining unit 332 of the rear-wheel steering angle determining unit 33.

The estimated driving force upper limit value $F_{lim}$ obtained by using Expression (7) is the resultant force of the driving force and the lateral force generated on the front wheels 11A and 11B at the reference time, and does not therefore exceed a value of a radius of a tire friction circle. Thus, the estimated driving force upper limit value $F_{lim}$ is smaller than the value of the radius of the tire friction circle of the front wheels 11A and 11B.

Next, the determination of the correction coefficient $C_R$ is described. Referring to FIG. 5, the correction coefficient determining unit 332 determines the correction coefficient $C_R$ by using the estimated front-wheel driving force $F_{XF}$ estimated by the driving force estimating unit 32 and the estimated driving force upper limit value $F_{lim}$ determined by the upper limit determining unit 35 (Step S106).

Specifically, when the estimated front-wheel driving force $F_{XF}$ is smaller than 0, the correction coefficient determining unit 332 determines the correction coefficient $C_R$ as 0. When the estimated front-wheel driving force $F_{XF}$ is larger than the estimated driving force upper limit value $F_{lim}$, the correction coefficient determining unit 332 determines the correction coefficient $C_R$ as 1.

When the estimated front-wheel driving force $F_{XF}$ is equal to or larger than 0 and is equal to or smaller than the estimated driving force upper limit value $F_{lim}$, the correction coefficient determining unit 332 determines the correction coefficient $C_R$ by using Expression (8).

$$C_R = \frac{F_{XF}}{F_{lim}} \quad (8)$$

In Expression (8), the symbol "$C_R$" represents the correction coefficient $C_R$, the symbol "$F_{XF}$" represents the estimated front-wheel driving force $F_{XF}$, and the symbol "$F_{lim}$" represents the estimated driving force upper limit value $F_{lim}$. As a result of the processing of Step S106, the correction coefficient $C_R$ is determined by the correction coefficient determining unit 332 as a numerical value that is equal to or larger than 0 and is equal to or smaller than 1.

Next, the correction of the rear-wheel steering angle target value $\delta_{TR}$ is described. Referring to FIG. 5, the rear-wheel steering angle correcting unit 333 corrects the rear-wheel steering angle target value $\delta_{TR}$ calculated by the rear-wheel steering angle calculating unit 331 by using the correction coefficient $C_R$ determined by the correction coefficient determining unit 332 (Step S107). Specifically, the rear-wheel steering angle correcting unit 333 corrects the rear-wheel steering angle target value $\delta_{TR}$ by using Expression (9).

$$\delta_R^* = C_R \times \delta_{TR} \qquad (9)$$

In Expression (9), the symbol "$\delta_R^*$" represents the rear-wheel steering angle instruction value $\delta_R^*$. That is, the rear-wheel steering angle instruction value $\delta_R^*$ is the rear-wheel steering angle target value $\delta_{TR}$ corrected by using the correction coefficient $C_R$. The other parameters in Expression (9) are described above in Expressions (1) to (5), and therefore their description is omitted.

The rear-wheel steering angle correcting unit 333 outputs the rear-wheel steering angle instruction value $\delta_R^*$ obtained by using Expression (9) to the rear-wheel power steering system 23. The rear-wheel power steering system 23 controls the rear wheels 21A and 21B so that the steering angles $\delta_R$ of the rear wheels 21A and 21B are adjusted to the rear-wheel steering angle instruction value $\delta_R^*$ acquired from the rear-wheel steering angle correcting unit 333. As described above, the attitude control system 30 determines the rear-wheel steering angle instruction value $\delta_R^*$ in real time by repeatedly executing the processing illustrated in FIG. 5.

Next, effects of the attitude control system 30 are described. First, the control of the steering angles $\delta_R$ based on the operation amount P of the accelerator pedal 15 is described. As described above, the attitude control system 30 detects the operation amount P of the accelerator pedal 15 in real time, and calculates the estimated front-wheel driving force $F_{XF}$ in real time by using the detected operation amount P. The attitude control system 30 determines the rear-wheel steering angle instruction value $\delta_R^*$ by using the estimated front-wheel driving force $F_{XF}$, and the rear-wheel power steering system 23 controls the steering angles $\delta_R$ of the rear wheels 21A and 21B so that the steering angles $\delta_R$ of the rear wheels 21A and 21B are adjusted to the rear-wheel steering angle instruction value $\delta_R^*$. As a result, the attitude control system 30 can suppress an understeering characteristic of the vehicle 1 when a related-art vehicle such as an automobile travels in a medium-speed or low-speed range. That is, when the vehicle 1 is accelerated while making a turn in the medium-speed or low-speed range, the attitude control system 30 can suppress a phenomenon in which the turning radius of the vehicle 1 increases.

The reason why the understeering characteristic can be suppressed is described below in detail.

The estimated front-wheel driving force $F_{XF}$ is calculated based on the operation amount P of the accelerator pedal 15. That is, the estimated front-wheel driving force $F_{XF}$ reflects a driver's intention such as an intention of the driver of the vehicle 1 to accelerate the vehicle 1 or keep the speed of the vehicle 1. The attitude control system 30 determines the rear-wheel steering angle instruction value $\delta_R^*$ by using the estimated front-wheel driving force $F_{XF}$. That is, the steering angles $\delta_R$ of the rear wheels 21A and 21B are controlled based on the operation amount P of the accelerator pedal 15 operated by the driver of the vehicle 1. In other words, the attitude control system 30 controls the steering angles $\delta_R$ of the rear wheels 21A and 21B when the driver of the vehicle 1 intends to accelerate the vehicle 1.

If the vehicle 1 does not include the attitude control system 30, the turning radius of the vehicle 1 increases due to the understeering characteristic when the vehicle 1 is accelerated while making a turn in the medium-speed or low-speed range. If the vehicle 1 includes the attitude control system 30, a lateral force for keeping the turning radius can be generated by controlling the steering angles $\delta_R$ of the rear wheels 21A and 21B when the vehicle 1 is accelerated while making a turn in the medium-speed or low-speed range. As a result, the vehicle 1 can suppress the phenomenon in which the turning radius increases when the vehicle 1 is accelerated while making a turn in the medium-speed or low-speed range (understeering characteristic).

The attitude control system 30 suppresses an increase in the number of driver's operations for keeping the turning radius of the vehicle 1, such as an operation of increasing the rotation angle of the steering wheel 13 or relaxing the depression of the accelerator pedal 15. That is, the attitude control system 30 can reduce a burden of the operation on the driver of the vehicle 1.

Next, the control of the steering angles of the rear wheels based on the vehicle speed $V_0$ and the yaw rate $\gamma_0$ is described.

The attitude control system 30 determines the rear-wheel steering angle target value $\delta_{TR}$ by using the vehicle speed $V_0$ and the yaw rate $\gamma_0$. As represented by Expression (3), the attitude control system 30 does not use the steering angles $\delta_F$ of the front wheels 11A and 11B when determining the rear-wheel steering angle target value $\delta_{TR}$. As represented by Expression (1), Expression (7), and Expression (8), the attitude control system 30 does not use the steering angles $\delta_F$ of the front wheels 11A and 11B when determining the correction coefficient $C_R$ to be used for correcting the rear-wheel steering angle target value $\delta_{TR}$. That is, the attitude control system 30 does not use the steering angles $\delta_F$ of the front wheels 11A and 11B when determining the rear-wheel steering angle instruction value $\delta_R^*$.

That is, the control of the steering angles $\delta_R$ of the rear wheels 21A and 21B that is performed by the attitude control system 30 is not directly affected by the operation amount of the steering wheel 13. In other words, the control of the steering angles $\delta_R$ of the rear wheels 21A and 21B that is performed by the attitude control system 30 is used for keeping the turning radius of the vehicle 1, but is not used for changing a traveling locus of the vehicle 1. The turning radius of the vehicle 1 is kept unless the driver of the vehicle 1 changes the rotation angle of the steering wheel 13 while the vehicle 1 is making a turn at a constant speed.

The attitude control system 30 determines the rear-wheel steering angle target value $\delta_{TR}$ by using the vehicle speed $V_0$ and the yaw rate $\gamma_0$. Therefore, when the vehicle 1 is accelerated while making a turn, the driver of the vehicle 1 need not operate the steering wheel 13 in order to keep the turning radius. That is, the attitude control system 30 can further reduce the burden of the operation on the driver of the vehicle 1.

Next, the use of the gravitational-center slip angle target value $\beta^*$ is described.

As represented by Expression (3), the attitude control system 30 uses the gravitational-center slip angle target value $\beta^*$ for determining the rear-wheel steering angle target value $\delta_{TR}$. As described above, the gravitational-center slip angle target value $\beta^*$ is determined as a value that is canceled out by the rotation component contained in the lateral force generated on the front wheels 11A and 11B. As a result, it is possible to suppress a phenomenon in which the grip force of the front wheels 11A and 11B reaches saturation in the tire friction circle. Detailed description is given below.

Referring to FIG. 4, the steering angle $\delta_F$ of the front wheel 10 is defined as an angle formed between the central axis HL and the reference line L1 of the front wheel 10. The steering angle $\delta_F$ of the front wheel 10 includes the gravitational-center slip angle $\beta$, the rotation component $S_F$, and the front-wheel sideslip angle $\beta_F$. The front-wheel sideslip angle $\beta_F$ is an angle formed between the reference line L1 of the front wheel 10 and the traveling direction D1 of the front wheel 10. The rotation component $S_F$ corresponds to a component that changes the direction of the reference line L1 of the front wheel 10 when the vehicle 1 makes a turn.

The steering angle $\delta_F$ of the front wheel 10 is solved based on Expression (4) and Expression (5), and thus Expression (10) can be obtained.

$$\delta_F = -\frac{ML_R V_0 \gamma_0}{LK_F} - \frac{L_F \gamma_0}{V_0} + \beta^* \tag{10}$$

The first term on the right side of Expression (10) corresponds to the front-wheel sideslip angle $\beta_F$. The second term on the right side of Expression (10) corresponds to the rotation component $S_F$ illustrated in FIG. 4. The third term on the right side of Expression (10) is the gravitational-center slip angle target value $\beta^*$. When the rotation component $S_F$ is canceled out by the gravitational-center slip angle target value $\beta^*$, the sum of the second term on the right side of Expression (10) and the third term on the right side of Expression (10) is zero.

When the gravitational-center slip angle target value $\beta^*$ is set so that the rotation component $S_F$ is canceled out by the gravitational-center slip angle target value $\beta^*$, the right side of Expression (10) is constituted only by the first term. That is, when the rotation component $S_F$ is canceled out by the gravitational-center slip angle target value $\beta^*$, the steering angle $\delta_F$ of the front wheel 10 can be set equal to the front-wheel sideslip angle $\beta_F$. In other words, the reference line L1 of the front wheel 10 coincides with the direction of the central axis HL of the vehicle 1. At this time, the front wheel 10 has a minimum lateral force (only the first term on the right side) required for the vehicle to make a turn through the motion at the yaw rate $\gamma_0$ and the vehicle speed $V_0$.

When the vehicle 1 is accelerated while making a turn, the driving force of the front wheels 11A and 11B increases. At this time, the rotation component $S_F$ is canceled out by the gravitational-center slip angle target value $\beta^*$, and the lateral force of the front wheels 11A and 11B is the minimum required lateral force (only the first term on the right side of Expression (10)). Therefore, the resultant force of the driving force and the lateral force of the front wheels 11A and 11B is reduced, thereby suppressing the phenomenon in which the front wheels 11A and 11B reach saturation in the tire friction circle. That is, when the rotation component $S_F$ is canceled out by the gravitational-center slip angle target value $\beta^*$, it is possible to prevent the phenomenon in which the grip force of the front wheels 11A and 11B reaches saturation in the tire friction circle. Thus, it is possible to expand a range of the front wheels 11A and 11B in which the acceleration intended by the driver of the vehicle 1 is achieved.

Next, the correction of the rear-wheel steering angle target value $\delta_{TR}$ using the correction coefficient $C_R$ is described.

As represented by Expression (9), the attitude control system 30 determines the rear-wheel steering angle instruction value $\delta_R^*$ by using the correction coefficient $C_R$. As represented by Expression (1), the estimated front-wheel driving force $F_{XF}$ is determined based on the operation amount P of the accelerator pedal 15. As represented by Expression (8), the correction coefficient $C_R$ is calculated as a ratio of the magnitude of the estimated front-wheel driving force $F_{XF}$ to the estimated driving force upper limit value $F_{lim}$.

Thus, the attitude control system 30 can control the steering angles $\delta_R$ of the rear wheels 21A and 21B based on the value of the operation amount P of the accelerator pedal 15 operated by the driver of the vehicle 1. In other words, the driver of the vehicle 1 can control the steering angles $\delta_R$ of the rear wheels 21A and 21B by changing the depression amount of the accelerator pedal 15.

The attitude control system 30 determines the rear-wheel steering angle instruction value $\delta_R^*$ by using the correction coefficient $C_R$, and can therefore change the steering angles $\delta_R$ of the rear wheels 21A and 21B based on the operation amount P of the accelerator pedal 15 operated by the driver. That is, the attitude control system 30 can facilitate the driver's control over the steering angles $\delta_R$ of the rear wheels 21A and 21B of the vehicle 1. Detailed description is given below.

It is assumed that the steering angles $\delta_R$ of the rear wheels 21A and 21B are changed depending on whether the accelerator pedal 15 is depressed or not. In this case, the steering angles $\delta_R$ of the rear wheels 21A and 21B are abruptly changed from zero to the rear-wheel steering angle instruction value $\delta_R^*$. As a result, the vehicle 1 may exhibit behavior that is not intended by the driver of the vehicle 1. Instead, the attitude control system 30 determines the rear-wheel steering angle instruction value $\delta_R^*$ by multiplying the rear-wheel steering angle target value $\delta_{TR}$ by the correction coefficient $C_R$ that is a numerical value equal to or larger than 0 and equal to or smaller than 1. The rear-wheel steering angle instruction value $\delta_R^*$ can be changed based on the operation amount P of the accelerator pedal 15 operated by the driver. Thus, the driver's intention can be reflected on the steering angles $\delta_R$ of the rear wheels 21A and 21B.

That is, the attitude control system 30 can facilitate the driver's control over the steering angles $\delta_R$ of the rear wheels 21A and 21B of the vehicle 1.

Modified examples of the embodiment described above are described. In the embodiment described above, description is given of the example in which the rear-wheel steering angle determining unit 33 outputs the rear-wheel steering angle target value $\delta_{TR}$ corrected by using the correction coefficient $C_R$ as the rear-wheel steering angle instruction value $\delta_R^*$. The present invention is not limited to this example. The rear-wheel steering angle determining unit 33 need not use the correction coefficient $C_R$. That is, the rear-wheel steering angle determining unit 33 may output the rear-wheel steering angle target value $\delta_{TR}$ directly as the rear-wheel steering angle instruction value $\delta_R^*$.

In the embodiment described above, description is given of the exemplary case where the upper limit determining unit 35 determines, as represented by Expression (7), the magnitude of the resultant force of the driving force and the lateral force generated on the front wheels 11A and 11B at the reference time as the estimated driving force upper limit value $F_{lim}$. The present invention is not limited to this case. For example, the upper limit determining unit 35 may determine an upper limit of the grip force of the front wheels 11A and 11B as the estimated driving force upper limit value $F_{lim}$. That is, the condition for determining the estimated driving force upper limit value $F_{lim}$ is not particularly limited as long as the upper limit determining unit 35 can obtain the estimated driving force upper limit value $F_{lim}$.

In the embodiment described above, description is given of the example in which the target slip angle determining unit 34 determines the gravitational-center slip angle target value $\beta^*$ so that the gravitational-center slip angle target value $\beta^*$ and the rotation component $S_F$ are canceled out. The present invention is not limited to this example. The condition for determining the gravitational-center slip angle target value $\beta^*$ is not particularly limited as long as the gravitational-center slip angle target value $\beta^*$ is determined so that the sum of the gravitational-center slip angle target value $\beta^*$ and the rotation component $S_F$ is equal to or smaller than the value of the rotation component $S_F$. For example, when the gravitational-center slip angle target value $\beta^*$ is determined so that the sum of the gravitational-center slip angle target value $\beta^*$ and the rotation component $S_F$ is smaller than the value of the rotation component $S_F$, it is possible to suppress the phenomenon in which the grip force of the front wheels 11A and 11B reaches saturation. The target slip angle determining unit 34 may determine the gravitational-center slip angle target value $\beta^*$ as zero. In this case, the traveling direction DG of the vehicle 1 can coincide with a tangential direction of a circle along which the vehicle 1 makes a turn.

In the embodiment described above, description is given of the example in which the rear-wheel steering angle calculating unit 331 calculates the rear-wheel steering angle target value $\delta_{TR}$ by using Expression (3) derived from the modeled vehicle 100. The rear-wheel steering angle calculating unit 331 may calculate the rear-wheel steering angle target value $\delta_{TR}$ by using a mathematical expression other than Expression (3). For example, the rear-wheel steering angle target value $\delta_{TR}$ may be calculated by using a mathematical expression derived from a modeled vehicle other than the modeled vehicle 100 illustrated in FIG. 3. That is, the rear-wheel steering angle calculating unit 331 only needs to calculate the rear-wheel steering angle target value $\delta_{TR}$ based on the vehicle speed $V_0$ and the yaw rate $\gamma_0$ of the vehicle 1 at the reference time.

In the embodiment described above, description is given of the example in which the rear-wheel steering angle determining unit 33 outputs the rear-wheel steering angle target value $\delta_{TR}$ corrected by using the correction coefficient $C_R$ as the rear-wheel steering angle instruction value $\delta_R^*$. The present invention is not limited to this example. For example, the rear-wheel steering angle determining unit 33 may determine the rear-wheel steering angle instruction value $\delta_R^*$ by multiplying the estimated front-wheel driving force $F_{XF}$ by a predetermined coefficient. That is, the rear-wheel steering angle determining unit 33 only needs to determine the rear-wheel steering angle instruction value $\delta_R^*$ based on the estimated front-wheel driving force $F_{XF}$.

In the embodiment described above, the estimated front-wheel driving force is calculated based on Expression (1) by using the operation amount P of the accelerator pedal 15. Through the operation of the accelerator pedal 15, a throttle opening degree, a fuel injection amount, and a current of a vehicle drive motor are determined. Therefore, the throttle opening degree, the fuel injection amount, or the current of the vehicle drive motor may be used as the control amount of the driving force control system in place of the operation amount of the accelerator pedal in order to calculate the estimated front-wheel driving force.

What is claimed is:

1. An attitude control system to be mounted on a vehicle configured to drive a front wheel and to control a steering angle of the front wheel and a steering angle of a rear wheel, the attitude control system comprising:
   a control amount detecting unit configured to detect a control amount of a driving force control system of the vehicle;
   a driving force estimating unit configured to estimate a driving force generated on the front wheel based on the detected control amount;
   a target slip angle determining unit configured to:
      determine a target value of a gravitational-center slip angle, which is an angle formed between a traveling direction of the vehicle and a vehicle reference line extending in a longitudinal direction of the vehicle through a gravitational center of the vehicle, and
      determine the target value of the gravitational-center slip angle so that a sum of the target value of the gravitational-center slip angle and a rotation component angle, which is formed based on a yaw rate of the vehicle at a reference time and a speed of the vehicle at the reference time, is smaller than the rotation component angle, the reference time being a time when an estimated front-wheel driving force is estimated; and
   a rear-wheel steering angle determining unit configured to:
      determine a rear-wheel steering angle instruction value configured to control the steering angle of the rear wheel based on the estimated front-wheel driving force, which is the driving force estimated by the driving force estimating unit,
      calculate the rear-wheel steering angle instruction value based on the speed of the vehicle at the reference time and based on the yaw rate of the vehicle at the reference time, and
      calculate the rear-wheel steering angle instruction value based on the target value of the gravitational-center slip angle.

2. The attitude control system according to claim 1, wherein the rear-wheel steering angle determining unit further includes:
   a correction coefficient determining unit configured to: (i) acquire an upper limit value of a magnitude of the estimated front-wheel driving force, and (ii) determine a correction coefficient based on the acquired upper limit value and the magnitude of the estimated front-wheel driving force; and
   a rear-wheel steering angle correcting unit configured to correct the rear-wheel steering angle instruction value determined by the rear-wheel steering angle calculating unit by using the correction coefficient.

3. The attitude control system according to claim 2, further comprising an upper limit determining unit configured to determine, as the upper limit value, a magnitude of a resultant force of the driving force generated on the front wheel at the reference time and a lateral force generated on the front wheel at the reference time.

* * * * *